Oct. 9, 1928.
J. G. FRAYNE ET AL
1,686,909
OSCILLATION RETARDING DEVICE
Filed July 25, 1927   2 Sheets-Sheet 1
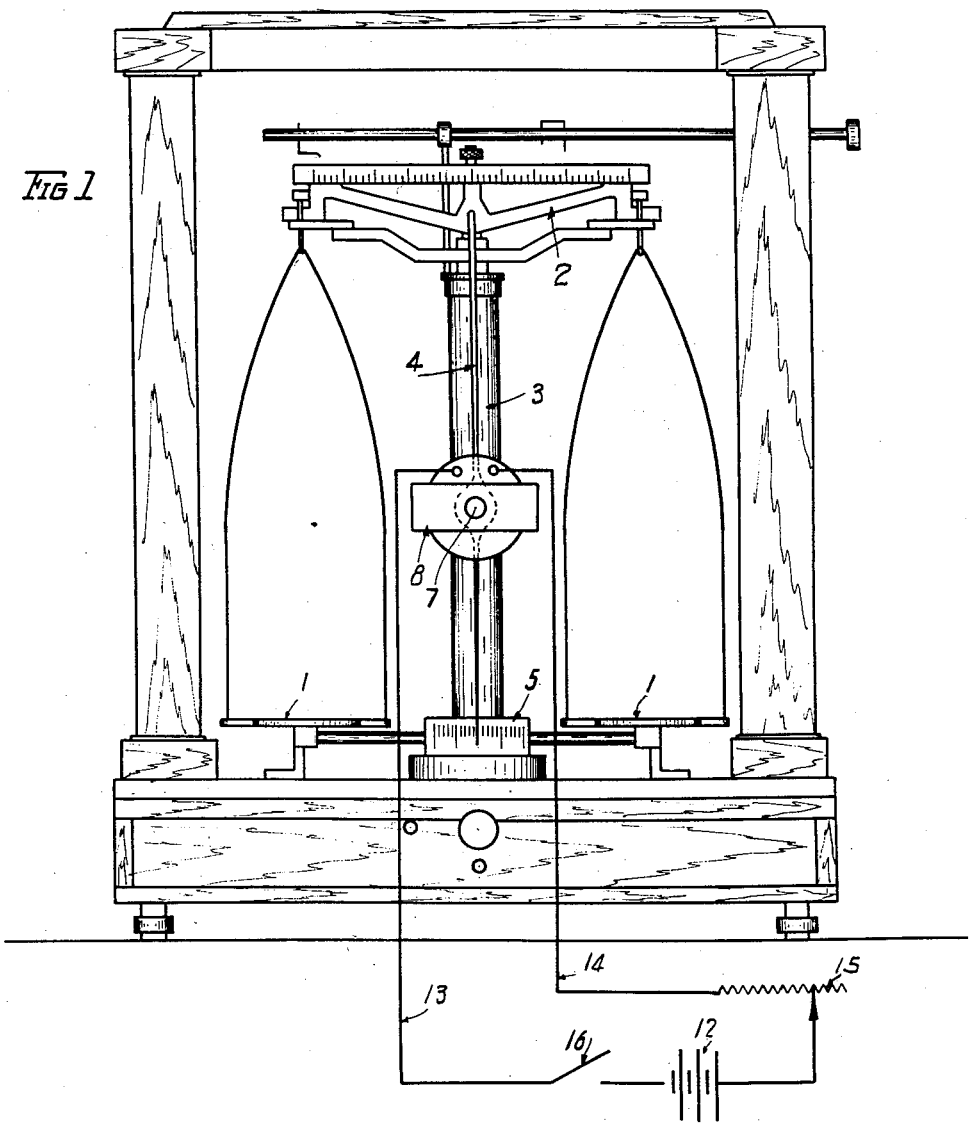

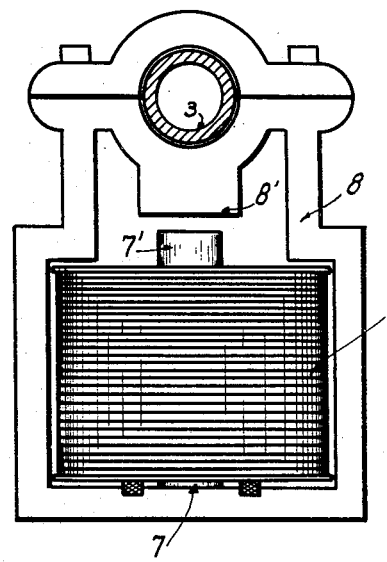
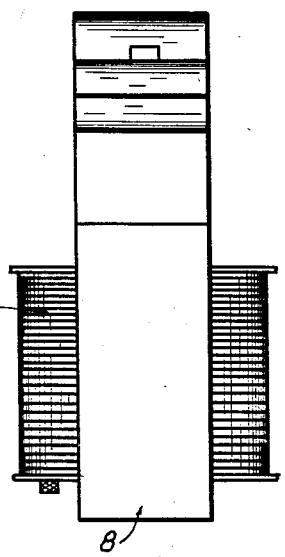
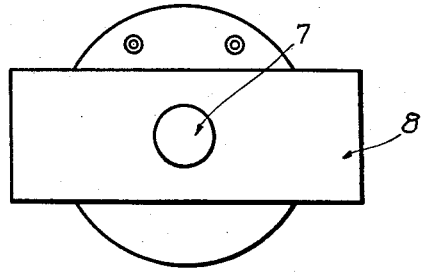
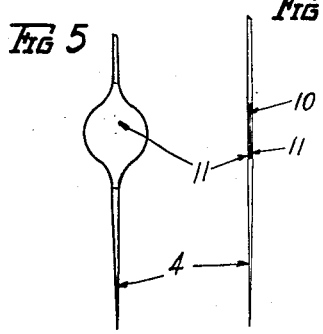

Patented Oct. 9, 1928.

1,686,909

UNITED STATES PATENT OFFICE.

JOHN G. FRAYNE, OF YELLOW SPRINGS, OHIO, AND FRANCIS D. MORAN, OF CHICAGO, ILLINOIS.

OSCILLATION-RETARDING DEVICE.

Application filed July 25, 1927. Serial No. 208,143.

This invention relates to oscillation retarders for scales, it particularly relating to a retarder of the magnetic type.

Attempts have heretofore been made to retard magnetically the oscillation of the moving parts of scales so as to cause the indicator to quickly settle to weighing position. These previous efforts contemplated the employment of a conductor connected with the moving parts and movable through a magnetic field to cause eddy currents to be set up in the conductor and produce a dampening torque to arrest the movement of the parts. These previous attempts have been unsatisfactory, however, for accurate weighing results, particularly in sensitive analytical balances, because of the fact that the conductors heretofore employed have been either paramagnetic or diamagnetic, which resulted in an incorrect weighing operation due to the fact that the magnetic field acted to move the conductor either towards or away from that part of the field having the greatest strength, thus causing the indicator to deviate one way or the other from the correct weighing position.

The object of our invention is to provide a retarder of the magnetic type having a movable conductor which will be non-magnetic in character so that, while responding to the dampening torque produced by its movement through the field, it will nevertheless be otherwise uninfluenced by the field to thereby enable the pointer to indicate the correct weight.

To that end one of the objects of our invention is to provide in a retarder of this character a conductor formed of a suitable combination of paramagnetic and diamagnetic conducting material so proportioned that the susceptibility of the conductor will be zero, it being understood in this connection that paramagnetic substances have a positive susceptibility while diamagnetic substances have a negative value.

A further object of our invention is to provide in a magnetic oscillation retarder an electro-magnet constructed to eliminate magnetic leakage so that when a strong magnetic substance is being weighed there will be no measurable effect upon the weighing operation.

In the accompanying drawings:

Fig. 1 is a front elevation of a balance showing our improved oscillation retarder installed thereon.

Fig. 2 is a side elevation of the electromagnet.

Fig. 3 is an end elevation of the magnet.

Fig. 4 is a bottom plan view of the magnet.

Fig. 5 is a side elevation of one form of conductor which we employ shown attached to a portion of the indicator.

Fig. 6 is an end elevation of the same.

In the present case we have shown our invention applied to a sensitive, analytical balance, but it is to be understood that the invention is also applicable to other types of scales, such for instance as price weighing scales of the automatic type. In the present scale, two pans 1 are shown suspended in the usual way from a beam 2 mounted upon the upper end of a central standard 3 with an indicator 4 connected with the beam and cooperating with a suitable indicator 5. Mounted upon the standard 3 is an electro-magnet, 6 representing the coil, 7 an inner core having a pole piece 7', and 8 a surrounding ring-like core piece provided with a pole 8' arranged opposite the pole 7' and separated therefrom by an air gap.

Mounted to oscillate freely in the air gap between the poles of the magnet is a conductor which is connected with a movable part of the balance. This conductor in the present case is carried by the indicator 4 and is preferably of disk-like shape forming an integral part of the indicator. One method of forming the conductor is illustrated in Figs. 5 and 6 in which the conductor is shown formed of three superimposed disks, the center disk 10 being commercial chemically pure copper and the two other disks 11 pure magnesium. Commercial chemically pure copper contains enough iron to make it paramagnetic, while pure magnesium is diamagnetic. The copper disk is substantially five-thousandths of an inch in thickness and each of the magnesium disks is about four-thousandths of an inch in thickness, all of the disks being of the same area, thus making the proportion substantially five-thirteenths copper and eight-thirteenths magnesium, which proportion has been found in practice to be suitable to render the conductor non-magnetic. The conductor may, however, be constructed in other ways, such for instance as forming it of alloy of suitable paramagnetic and non-magnetic substances substantially in the proportions mentioned, or by electroplating one metal or alloy of a paramagnetic nature on another metal or alloy of a diamagnetic nature.

The electro-magnet in the present case is shown in circuit with a battery 12 through the wires 13 and 14, with a suitable rheostat 15, interposed in the wire 14. This rheostat is for the purpose of adjusting the magnetic field during the weighing process to secure the proper degree of dampening throughout the operation, since the sensitiveness of the balance decreases with the load on the pans. It should be explained in this connection that the operation of weighing on sensitive balances is a tedious one, requiring a considerable length of time to estimate the proper point of balance.

In operation after the balance is set swinging by the usual method of weighing with balances, a switch 16 controlling the circuit is closed, energizing the magnet and causing a magnetic field to be set up in the air gap and eddy currents in the conductor, resulting in the dampening of the movement of the indicator. The strength of the field is adjusted by means of the rheostat to give the best results of causing the moving parts to be quickly restored. By making the conductor non-magnetic in the manner described the indicator will not be influenced by the magnet when at rest, but will quickly move to rest at correct weighing position. Further, by the construction of the magnet, the magnetic flux is so confined by the iron core that there is no measurable effect on the weighing operation when weighing substances of a magnetic character.

Having thus described our invention, we claim:

1. The combination of a moving part arranged to oscillate and having a position of rest, a magnet, and a member connected with said part and movable through the field of said magnet, said member having the characteristic of being non-magnetic as a whole and possessing the property of conducting electrical currents induced by the magnetic field of the magnet.

2. The combination of a moving part arranged to oscillate and having a position of rest, a magnet, and a non-magnetic conductor connected with said part and movable through the field of said magnet.

3. The combination of a moving part arranged to oscillate and having a position of rest, a magnet, and a non-magnetic conductor connected with said part and movable through the field of said magnet, said conductor being formed of a combination of suitable diamagnetic and paramagnetic conducting materials in proper proportion to render said conductor non-magnetic.

4. The combination of a moving part arranged to oscillate and having a position of rest, a magnet, and a conductor connected with said part and movable through the field of said magnet, said conductor being formed of commercial chemically pure copper and magnesium in the proportions of substantially five parts copper and eight parts magnesium.

5. In a weighing device, the combination of a movable indicator, a magnet, a member connected with said indicator and movable through the field of said magnet, said member having the characteristic of being non-magnetic as a whole and possessing the property of conducting electrical currents induced by the magnetic field of the magnet.

6. In a weighing device, the combination of a movable indicator, a magnet, and a non-magnetic conductor connected with said indicator and movable through the field of said magnet.

7. In a weighing device, the combination of a movable indicator, a magnet, and a conductor connected with said indicator and movable through the field of said magnet, said conductor being formed of a combination of suitable diamagnetic and paramagnetic conducting materials in proportion to render said conductor non-magnetic.

8. In a weighing device, the combination of an indicator, a magnet, and a conductor connected with said indicator and movable through the field of said magnet, said conductor being formed of commercial chemically pure copper and magnesium in the proportions of substantially five parts copper and eight parts magnesium.

9. In a retarding device of the character described, the combination of a movable part arranged to oscillate and having a position of rest, an electro-magnet having an inner core and a core piece surrounding its coil with the poles arranged opposite each other and separated by an air gap, and a non-magnetic conductor connected with said movable part and movable through said air gap.

10. In a retarder for a weighing device, the combination of a movable indicator arranged to oscillate and having a position of rest, an electro-magnet having an inner core and a core piece surrounding its coil with the poles arranged opposite each other and separated by an air gap, and a non-magnetic conductor connected with said movable indicator and movable through said air gap.

In testimony whereof, we have hereunto set our hands the 20th and 23rd days of June, 1927, respectively.

JOHN G. FRAYNE.
FRANCIS D. MORAN.